(No Model.)

J. D. COXWELL.
HAY PRESS.

No. 605,080. Patented June 7, 1898.

Witnesses

Inventor
John D. Coxwell
by H. B. Willson & Co
Attorney

United States Patent Office.

JOHN D. COXWELL, OF AUGUSTA, GEORGIA, ASSIGNOR TO HERRETT IANTHA COXWELL, OF SAME PLACE.

HAY-PRESS.

SPECIFICATION forming part of Letters Patent No. 605,080, dated June 7, 1898.

Application filed January 24, 1898. Serial No. 667,794. (No model.)

*To all whom it may concern:*

Be it known that I, JOHN D. COXWELL, a citizen of the United States, residing at Augusta, in the county of Richmond and State of Georgia, have invented certain new and useful Improvements in Horse-Power Hay-Presses; and I do declare the following to be a full, clear, and exact description of the invention, such as will enable others skilled in the art to which it appertains to make and use the same.

My invention relates to improvements in hay-presses, and more particularly to that class employing a horse-power sweep to effect the compression; and the object is to provide a simple, inexpensive, and effective machine for this purpose.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claim at the end of this specification.

The same reference-numerals indicate the same parts of the invention.

Figure 1:
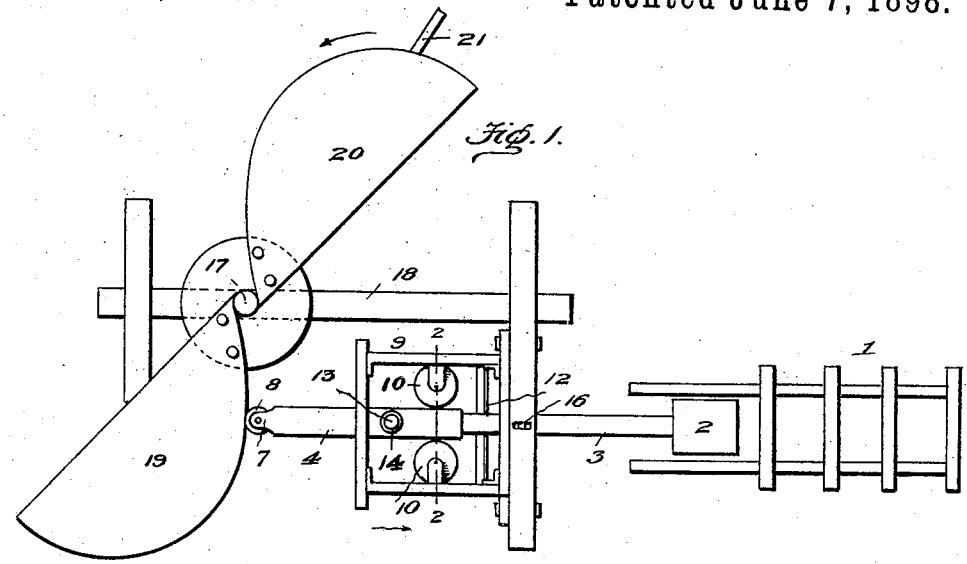
Figure 2:
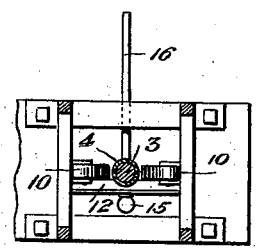
Figure 3:
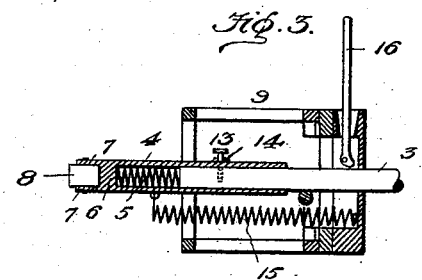

Figure 1 is a top plan view of my improved hay-press. Fig. 2 is a transverse section on the dotted line 2 2 of Fig. 1. Fig. 3 is a longitudinal section through the follower-rod.

1 denotes the press-box, 2 the follower-block, and 3 the follower-rod, which is preferably rectangular in cross-section, and 4 denotes a correspondingly-formed sleeve, which encompasses the free end of said rod so as to slide freely thereon, a stout spiral spring 5 being interposed between the end of the rod and the head 6 of the sleeve. The head of the sleeve is formed with two parallel jaws 7 7, in which is journaled a vertical friction-roller 8.

9 denotes a fixed guide-frame provided with vertical parallel guide-rollers 10 10, one of which is journaled on each side of the follower-rod and with a third horizontal roller 12, which forms a rolling-support for the forward end of the rod when in operation.

13 represents a lateral socket on the sleeve to receive a set-screw 14, so that the sleeve may be fixed to the follower-rod when desired.

15 denotes a retractile spring for withdrawing the follower-rod from the box.

16 denotes a cam-faced lever fulcrumed in the frame 9, and it may be used to grip the rod 3 to retain the follower in the box while the bale is being tied.

17 represents a vertical shaft journaled in the rectangular frame 18, and to its upper end is fixed in any suitable manner the oppositely-arranged cam-faced arms 19 20, which alternately bear against the roller 8 and force the follower-block inwardly against the action of the spring 15, which retracts it.

21 denotes the sweep to which the horses are attached, the sweep traveling in the direction of the arrows, the cam-faced arms making two movements of the follower to one revolution of the sweep.

Having thus fully described my invention, what I claim as new and useful, and desire to secure by Letters Patent of the United States, is—

The combination in a hay-press of the cam-faced arms 19, 20, the press-box and the guide-frame 9, with the follower, the follower-rod, the sleeve 4 formed with socket 13 and the set-screw 14, the roller 8 journaled in the front end of said sleeve, the spring 5 interposed between the head of the sleeve and the end of the follower-rod and the retractile spring 15, extending from the frame 9 to the follower-rod 3, substantially as shown and described.

In testimony whereof I have hereunto set my hand in presence of two subscribing witnesses.

JOHN D. COXWELL.

Witnesses:
A. B. CRUMP,
E. A. SIBLEY.